Patented Sept. 25, 1923.

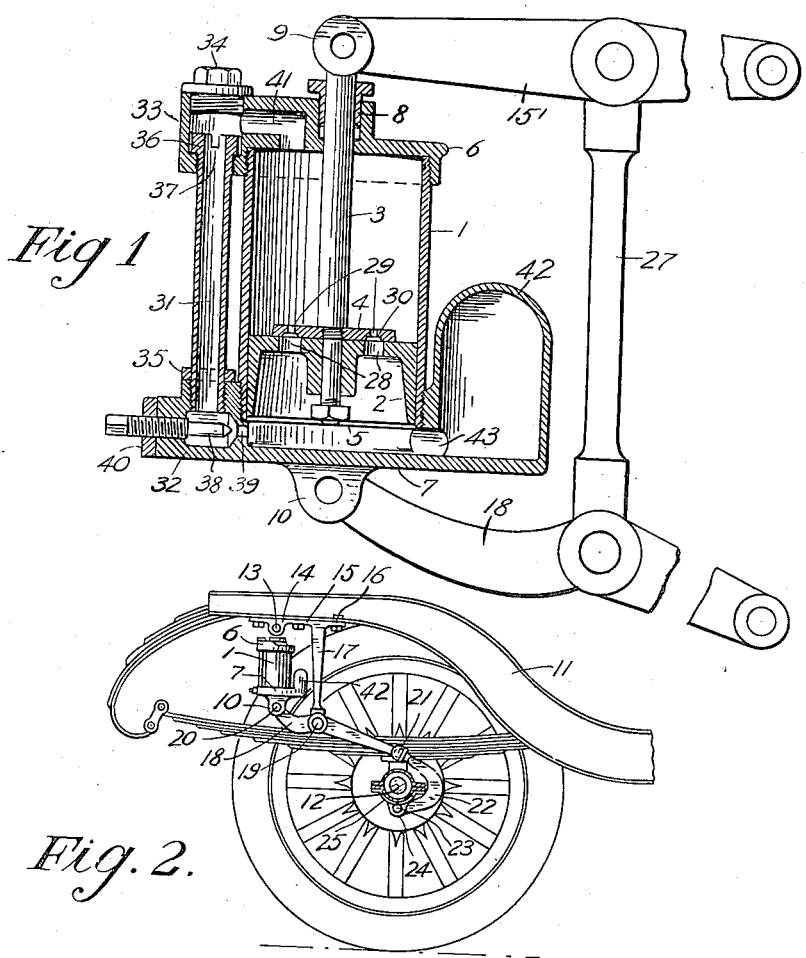

1,468,652

UNITED STATES PATENT OFFICE.

WILLIAM J. STOREY, OF PORT MELBOURNE, VICTORIA, AUSTRALIA.

SHOCK ABSORBER.

Application filed October 11, 1918. Serial No. 257,710.

*To all whom it may concern:*

Be it known that I, WILLIAM JOHN STOREY, a subject of the King of Great Britain, residing at 70 Albert Street, Port Melbourne, in the State of Victoria, Commonwealth of Australia, have invented new and useful Improvements in Shock Absorbers, of which the following is a specification.

This invention relates to an improved shock absorber for suppressing the violent recoil due to the rapid recovery of the suspension springs of motor and like vehicles after undergoing sudden and considerable deflection in passing over obstacles or ruts encountered by the vehicle in the roadway.

The improved device operates so as to restrain the force of the rebound of the suspension springs by the provision of an adjustable resistance, which slightly delays the recovery of the springs when considerably deflected but not in a manner that will interfere with the efficient working thereof.

The invention, moreover, provides means for permitting the free working of the springs as the vehicle passes over numerous small obstacles or ruts in the roadway, the adjustable resistance coming into operation only under the action of forces which cause sudden and considerable distortion of the vehicle springs.

Furthermore, the present invention by restraining the recoil of the vehicle springs prevents "brushing" and slipping of the wheels upon the roadway, and consequently saves that undue wear of tyres which occurs when the rebound of the springs is unrestrained.

The improved device is simple and durable in construction and can be economically manufactured and arranged in a variety of ways that permit of it being readily attached to the different types of motor vehicles in use.

In order that the invention may be more readily understood reference will now be had to the accompanying drawings wherein:—

Figure 1 illustrates in vertical section a device made in accordance with the present invention and shews the essential features thereof.

Figure 2 is a view in side elevation as seen from the inside of the wheel shewing the application of the invention to a motor vehicle.

Figure 3 is a similar view to Figure 2 and shews a modified application of the invention.

In these drawings like characters of reference refer to similar parts and the numeral 1 designates a cylinder filled with oil or other suitable fluid as glycerine and fitted with a piston 2 which is free to move on the piston rod 3 to a limited extent between the plate 4 fixed to the rod 3 and adjustable nut 5. The nut 5 is secured in its adjusted position by a pin passed transversely through said nut 5 and the rod 3.

The cylinder 1 is closed at its upper and lower ends by covers 6 and 7 respectively. The upper cover 6 is provided with a stuffing box 8 through which the piston rod 3 projects, the latter being provided at its upper end with an eye 9. The lower cover 7 has a lug 10 formed on the underside thereof and integrally therewith.

The eye 9 and lug 10 are preferably connected to the chasis frame 11 and axle 12, respectively, by means of a leverage system which reduces the length of the stroke of the piston 2 and consequently the length of the cylinder 1, the device being thereby rendered very compact. For this purpose the eye 9 is pivotally attached by a transverse pin or bolt 13 to a lug 14 formed on a bar 15 which is fastened by bolts 16 to the chassis frame 11. A downwardly projecting strut 17 is formed integrally with the bar 15 and pivotally supports a lever 18 on a transverse pin or bolt 19.

The lever 18 at one end is pivotally attached to the lug 10 by a transverse pin or bolt 20 and at its other end is attached by a ball and socket joint 21 to a link 22. This link is bent partly round the axle 12 and has its lower end secured by means of a pin or bolt 23 to a lug 24 which is formed on a clip 25 secured to the axle 12 in any approved way.

The lever 18 is pivotally attached to the strut 17 at a point approximately one-third of its length from the lug 10 and in consequence the motion of the piston 2 is approximately one-third that of a given movement of the axle 12.

In a modified arrangement of the invention shewn in Figure 3 of the drawings a lug 26 is formed on the bar 15 and a link 27 pivotally attached by a transverse pin or bolt 28ª to the lug 26 depends downwardly therefrom and pivotally supports the lever 18 as described. In this arrangement the link 22 is dispensed with and the ball and socket joint 21 is fixed directly above the axle 12 to the clip 25.

In a further modification of the leverage system the bar 15 shewn in Figures 2 and 3 is constructed as a lever 15' as shewn by broken lines in Figure 1 and is connected by the link 27 to the lever 18. In this arrangement the outer ends of the levers 15' and 18 are attached to the chassis 11 and axle 12, respectively.

In operation, upon the vehicle passing over an obstacle or rut the spring is deflected and the axle 12 and chassis 11 approach each other, the lever 18 acting so as to withdraw the cylinder 1 downwardly and causing the piston 2 carried upon the piston rod 3 to be relatively raised to a higher pont in the cylinder 1.

The piston rod 3 is first withdrawn until the nut 5 contacts with the piston 2. The latter then travels up the cylinder 1 and the oil above said piston 2 flows through the ring of holes 28 therein to the underside thereof.

When the rebound of the springs occurs the piston rod 3 commences to travel downwardly and the piston 2 comes into contact with the plate 4, the holes 28 being thereby closed and the oil being compelled to pass through one or more small breathing-holes 29 to the upper side of the piston 2. An annular groove 30 is formed in the plate 4 or in the piston 2 which affords a passage for the oil in the event of the piston turning so as to bring the small holes 29 in alignment with the bridges between the holes 28.

The fluid friction due to the viscosity of the oil as it flows through the breathing holes 29 offers a yieldable resistance to the sudden recoil of the springs, which is thereby restrained and sufficiently delayed to avoid damage to the vehicle and its parts and discomfort to the passengers.

In order that the best results may be obtained and to provide for varying conditions of viscosity of the oil, it is necessary to provide means for adjusting the effective area of the breathing holes. These holes being situated within the closed cylinder are difficult of access and accordingly an adjustable by-pass is provided which leads from the bottom to the top of the cylinder 1 and through which portion of the oil is adapted to flow from the underside to the upperside of the piston 2 during the recoil of the springs.

This by-pass comprises a pipe 31 which leads from a lateral extension 32 of the lower cover 7 to a lateral extension 33 of the upper cover 6. This by-pass pipe 31 is placed in position, after the extensions 32 and 33 are brought into alignment, through a hole in the upper extension 33 which is normally closed by a plug 34, which may be removed in order to add oil to the cylinder 1 when required.

The pipe 31 extends downwardly and is screwed into the upperside of the lateral extension 32 being firmly secured therein by a locknut 35.

The upper end of the pipe 31 is formed with a head 36 having a slot 37 by means of which the said pipe 31 may be turned with a screw-driver, and suitable packing may be inserted beneath the head 36 to prevent leakage of oil.

In order to regulate the amount of oil which passes through the pipe 31, an adjustable needle valve 38 is screwed laterally into the extension 32 and is adapted to adjust the area of the orifice 39 leading from the cylinder 1.

The size of the orifice 39 may thereby be adjusted without difficulty and the amount of oil which flows therethrough easily regulated so as to give the best results. The needle valve 38 is securely held in its adjusted position by a locknut 40 and the oil which escapes through the orifice 39 passes upwardly by way of pipe 31 and flows to the upper end of the cylinder 1 through the orifice 41.

To permit of free working of the springs as the vehicle passes over small obstacles and ruts in the roadway an air vessel 42 is secured to the lower cover 7 and communicates by an orifice 43 therein with the cylinder 1.

This air vessel 42 contains air above the surface of the oil therein, which air forms an elastic cushion and freely permits of small oscillations of the piston 2, thereby ensuring the free working of the springs, while in no way interfering with the operation of the device when the vehicle passes over an obstacle or rut of such a size as to cause a rebound of the springs.

In practice the cylinder 1 is preferably filled to a height a little short of its full capacity and the device may be covered with a flexible covering to exclude dust from the piston rod.

The improved device may be modified and altered in detail in various ways without departing from the spirit or scope of the invention.

What I do claim is:—

1. A shock absorber comprising an oil filled cylinder, a cover on said cylinder, a stuffing box in said cover, a piston rod passing through said stuffing box, a perforate piston fitting said cylinder and mounted on the piston rod to have a limited to and fro movement thereon; a plate fixed on said piston rod having small holes in line with the perforations in the piston, a by-pass connecting the upper and lower ends of said cylinder, an adjustable valve in said by-pass, an air compression chamber in communication with the lower end of the cylinder, and means to connect the piston rod and the cylinder to the chassis frame and the axle of the vehicle respectively, substantially as described.

2. The combination with the spring suspension of a vehicle to have movement relative to and away from each other of a liquid containing cylinder; a piston reciprocable in the cylinder; means to permit the flow of liquid from the cylinder at one side of the piston to the opposite side of the piston and to restrict such flow in one direction; means to pivotally connect the piston to one of the movable parts of the vehicle; a lever pivotally connected at one end to the cylinder and the other end having a connection for universal movement with the other movable part of the vehicle, and a strut pivotally connected to the lever between the ends thereof and having a fixed connection with the part of the vehicle to which the piston is connected for the purpose specified.

In testimony whereof I affix my signature in presence of two witnesses.

WILLIAM J. STOREY.

Witnesses:
A. J. CALLINAN,
JAMES H. ANDERSON.